US010269502B2

(12) United States Patent
Michihata et al.

(10) Patent No.: US 10,269,502 B2
(45) Date of Patent: Apr. 23, 2019

(54) ENERGY STORAGE DEVICE INCLUDING A CONDUCTIVE MEMBER PENETRATING A CONTAINER AND A FIXING MEMBER COVERING THE CONDUCTIVE MEMBER

(71) Applicant: GS Yuasa International Ltd., Kyoto-shi (JP)

(72) Inventors: Ryota Michihata, Kyoto (JP); Takahiro Shizuki, Kyoto (JP); Naoki Ota, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 65 days.

(21) Appl. No.: 15/231,536

(22) Filed: Aug. 8, 2016

(65) Prior Publication Data
US 2017/0062790 A1 Mar. 2, 2017

(30) Foreign Application Priority Data

Aug. 25, 2015 (JP) ................................. 2015-166266
Jun. 17, 2016 (JP) ................................. 2016-121233

(51) Int. Cl.
*H01M 2/24* (2006.01)
*H01M 10/0587* (2010.01)
*H01M 2/02* (2006.01)
*H01G 9/042* (2006.01)
*H01G 9/008* (2006.01)
*H01G 9/055* (2006.01)
*H01G 9/045* (2006.01)
*H01M 10/0525* (2010.01)
*H01G 9/10* (2006.01)
*H01M 2/06* (2006.01)
*H01M 2/22* (2006.01)

(52) U.S. Cl.
CPC .......... *H01G 9/0425* (2013.01); *H01G 9/008* (2013.01); *H01G 9/045* (2013.01); *H01G 9/055* (2013.01); *H01G 9/10* (2013.01); *H01M 2/06* (2013.01); *H01M 2/22* (2013.01); *H01M 10/0525* (2013.01); *H01M 10/0587* (2013.01)

(58) Field of Classification Search
CPC ............. H01M 2/06; H01M 2/30; H01M 2/22
See application file for complete search history.

(56) References Cited

U.S. PATENT DOCUMENTS 4,939,048 A * 7/1990 Vignaud ................. H01M 2/30
429/161
8,632,912 B2 * 1/2014 Okamoto ............ H01M 2/0404
429/182

(Continued)

FOREIGN PATENT DOCUMENTS

JP S 59-86154 A 5/1984
JP S 61-103866 U 7/1986

(Continued)

*Primary Examiner* — Imran Akram
(74) *Attorney, Agent, or Firm* — McGinn I. P. Law Group, PLLC

(57) ABSTRACT

An energy storage device includes: a container; a terminal disposed outside the container or a current collector disposed inside the container; a conductive member penetrating the container and connected to the current collector or the terminal; and a fixing member joining the current collector or the terminal and the conductive member to each other.

20 Claims, 9 Drawing Sheets

(56) References Cited

U.S. PATENT DOCUMENTS

| | | | |
|---|---|---|---|
| 8,748,034 B2* | 6/2014 | Sasaki | H01M 2/043 429/182 |
| 2009/0087737 A1 | 4/2009 | Yamauchi et al. | |
| 2011/0076552 A1 | 3/2011 | Taniguchi et al. | |
| 2011/0117427 A1* | 5/2011 | Lin | H01M 2/06 429/185 |
| 2012/0003518 A1* | 1/2012 | Fischel | H01M 2/38 429/69 |
| 2012/0264007 A1* | 10/2012 | Sasaki | H01M 2/043 429/182 |
| 2012/0264008 A1* | 10/2012 | Okamoto | H01M 2/0404 429/182 |
| 2013/0273416 A1* | 10/2013 | Masuda | H01M 2/30 429/179 |
| 2014/0178744 A1* | 6/2014 | Zhu | H01M 2/202 429/158 |
| 2014/0242439 A1 | 8/2014 | Hattori et al. | |
| 2014/0308548 A1* | 10/2014 | Hwang | H01M 2/06 429/53 |
| 2015/0243943 A1* | 8/2015 | Masuda | H01M 2/06 429/7 |
| 2015/0318519 A1* | 11/2015 | Tsutsumi | H01M 2/06 429/158 |
| 2018/0013125 A1* | 1/2018 | Hattori | H01M 2/04 |

FOREIGN PATENT DOCUMENTS

| | | | | |
|---|---|---|---|---|
| JP | H 07-245093 A | 9/1995 | | |
| JP | 2003-288867 A | 10/2003 | | |
| JP | 2009-037817 A | 2/2009 | | |
| JP | 2009-087693 A | 4/2009 | | |
| JP | 2010-033766 A | 2/2010 | | |
| JP | 2011-023141 A | 2/2011 | | |
| JP | 2011-076867 A | 4/2011 | | |
| JP | 2012-028246 A | 2/2012 | | |
| JP | 2013-161584 A | 8/2013 | | |
| JP | 2014-167846 A | 9/2014 | | |
| JP | 2014-229564 A | 12/2014 | | |
| JP | 2015-115113 A | 6/2015 | | |
| JP | 2015-039371 | * | 3/2016 | H01M 2/10 |
| WO | WO-2014103874 A1 | * | 7/2014 | H01M 2/06 |
| WO | WO-2016136249 A1 | * | 9/2016 | H01M 2/04 |

* cited by examiner

ENERGY STORAGE DEVICE INCLUDING A CONDUCTIVE MEMBER PENETRATING A CONTAINER AND A FIXING MEMBER COVERING THE CONDUCTIVE MEMBER

CROSS-REFERENCE TO RELATED APPLICATIONS

This application claims the benefit of Japanese patent applications No. 2015-166266 filed on Aug. 25, 2015, and No. 2016-121233 filed on Jun. 17, 2016, which are incorporated by reference.

FIELD

The present invention relates to an energy storage device.

BACKGROUND

There has been known an energy storage device where terminals mounted on an outer portion of a container and current collectors disposed inside the container are connected to each other by conductive members. Connection strength between the terminals or the current collectors and the conductive members is ensured by welding the terminals or the current collectors and the conductive members to each other. See JP 2012-28246 A, for example.

When the terminal or the current collector and the conductive member are directly welded to each other, a swaged portion of the conductive member, that is, a bent portion of the conductive member is welded. In this case, a portion to be welded has an unstable shape and hence, there is a possibility that welding cannot be performed satisfactorily. When the weld turns out unstable, there is a concern that the connection between the terminal or the current collector and the conductive member is loosened due to vibrations or an impact. This loosening causes the increase of electric resistance so that the energy storage device cannot sufficiently exhibit energy storing performance.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

It is an object of the present invention to provide an energy storage device which can maintain energy storage performance for a long period by suppressing loosening of connection between a terminal or a current collector and a conductive member.

An energy storage device according to an aspect of the present invention includes: a container; a terminal disposed outside the container or a current collector disposed inside the container; a conductive member penetrating the container and connected to the current collector or the terminal; and a fixing member joining the current collector or the terminal and the conductive member to each other.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An energy storage device according to an aspect of the present invention includes: a container; a terminal disposed outside the container or a current collector disposed inside the container; a conductive member penetrating the container and connected to the current collector or the terminal; and a fixing member joining the current collector or the terminal and the conductive member to each other.

According to the aspect of the present invention, it is possible to provide an energy storage device which can suppress loosening of connection between a current collector or a terminal and a conductive member with the use of a fixing member, thus maintaining energy storage performance for a long period.

The end portion of the conductive member may be swaged, and the terminal or the current collector may be fixed between the end portion of the conductive member and the container.

The fixing member may be formed of a plate body, and at least two different sides of the plate body may be joined to the current collector or the terminal.

The energy storage device may include the terminal and the current collector, the terminal and the current collector may be connected to each other by the conductive member, and the terminal and the current collector may be joined to the conductive member by the fixing member.

A through hole may be formed in the fixing member, and a portion of a periphery of the through hole and the conductive member may be joined to each other.

The fixing member may be formed of a plate body, and a portion of a periphery of the plate body and the conductive member may be joined to each other.

The fixing member may be formed of a plate body, and may have two or more bent portions.

Hereinafter, an energy storage device according to an embodiment of the present invention is described with reference to drawings. The embodiment described hereinafter describes preferred specific examples of the present invention. In the embodiment described hereinafter, numerical values, shapes, materials, constitutional elements, the arrangement positions and connection states of the constitutional elements, manufacturing steps, the order of manufacturing steps and the like are merely examples, and these are not intended to be used for limiting the present invention. Further, among the constitutional elements in the embodiment described hereinafter, the constitutional elements which are not described in independent claims describing an uppermost concept are described as arbitrary constitutional elements.

Embodiment

Figure 1:
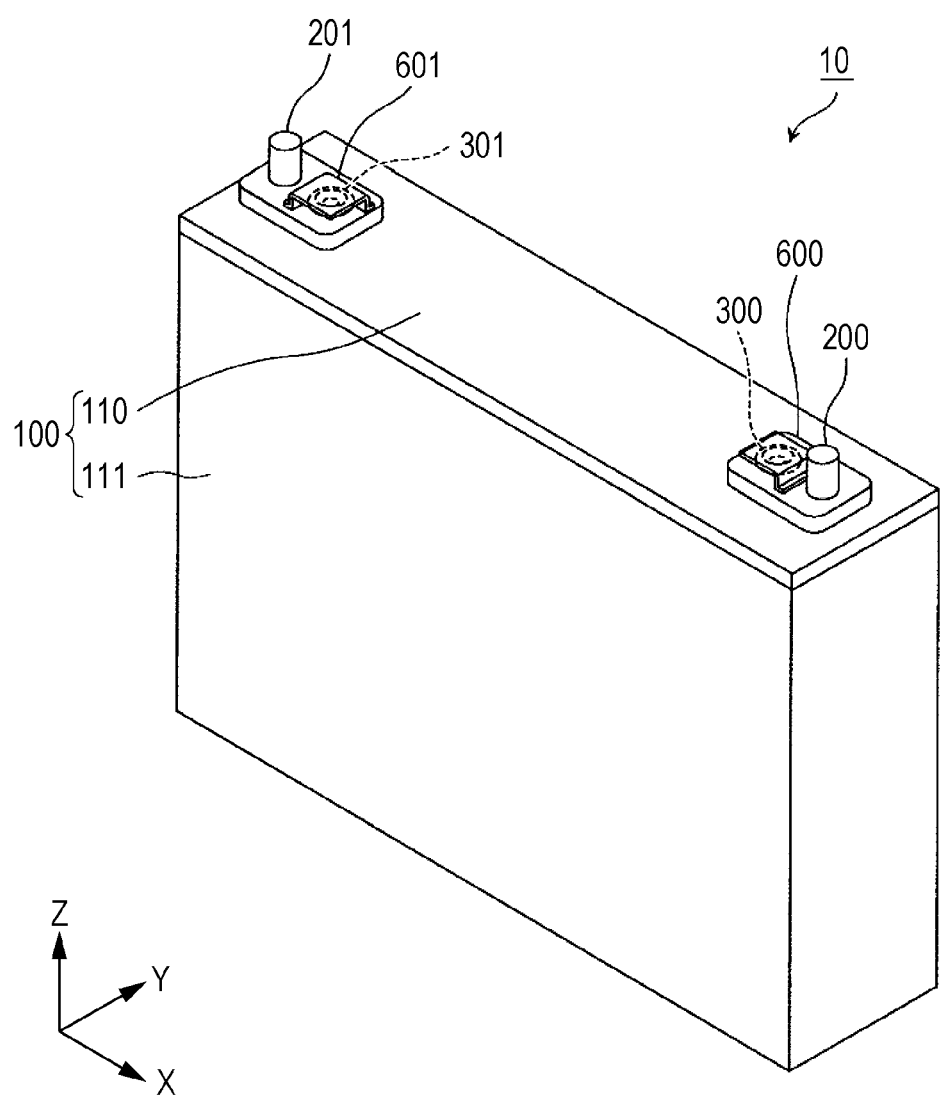
FIG. 1 is a perspective view schematically showing an external appearance of an energy storage device according to an embodiment of the present invention.
Figure 2:
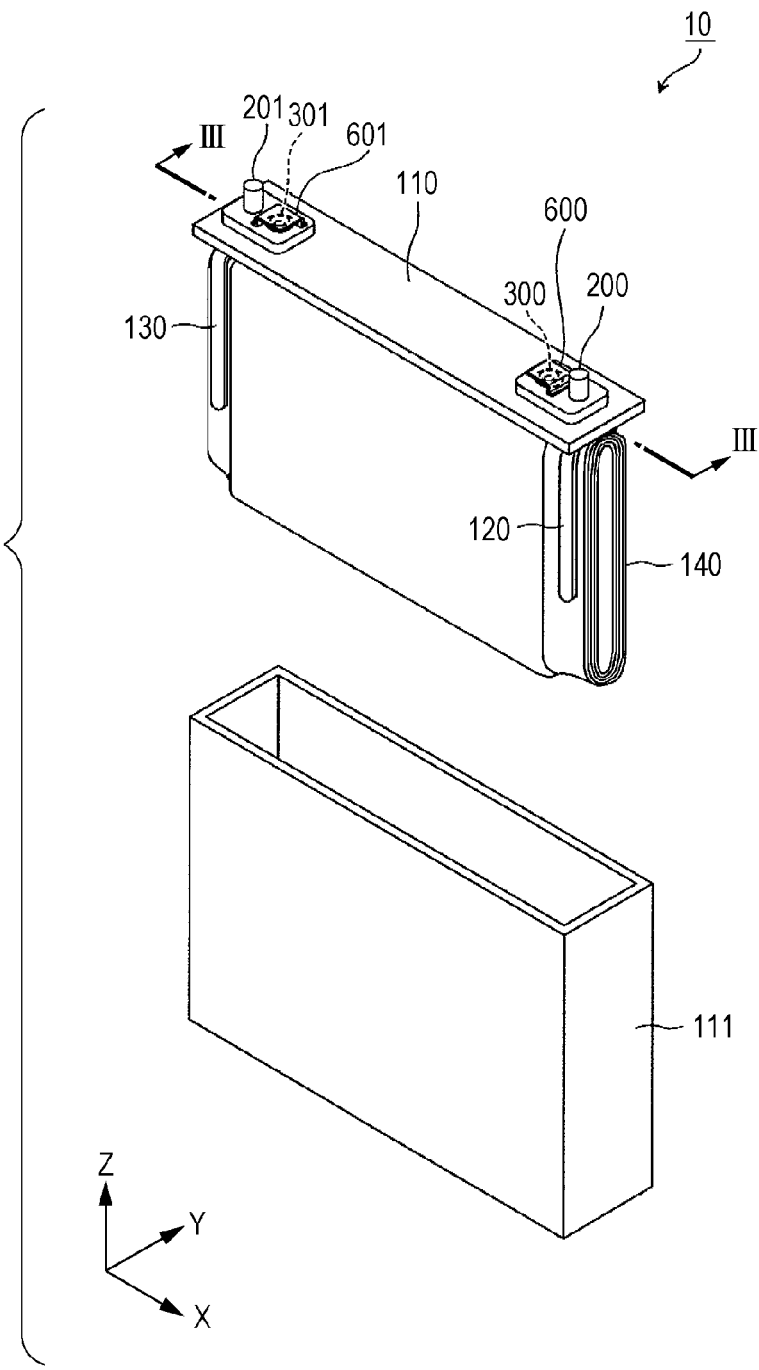
FIG. 2 is a perspective view showing respective constitutional elements which the energy storage device includes in a state where a container body of a container of the energy storage device is separated from other constitutional parts.

First, the configuration of an energy storage device 10 is described. FIG. 1 is a perspective view schematically showing an external appearance of the energy storage device 10 according to an embodiment of the present invention. FIG. 2 is a perspective view showing respective constitutional elements which the energy storage device 10 according to the embodiment of the present invention includes in a state where a container body 111 of a container 100 of the energy storage device 10 is separated from other constitutional parts of the energy storage device 10. In these drawings, the Z axis direction is indicated as the vertical direction, and the description may be made hereinafter using the Z axis direction as the vertical direction. However, there may be also a case where the Z axis direction does not extend in the vertical direction depending on a mode of use and hence, the Z axis direction is not limited to the vertical direction. The same goes for drawings which are referenced hereinafter.

The energy storage device 10 is a secondary battery capable of charging and discharging electricity. To be more specific, the energy storage device 10 is a nonaqueous electrolyte secondary battery such as a lithium ion secondary battery. The energy storage device 10 is not limited to a nonaqueous electrolyte secondary battery, and may be a secondary battery other than a nonaqueous electrolyte secondary battery, or may be a capacitor.

As shown in FIG. 1 and FIG. 2, the energy storage device 10 includes: a container 100; a positive electrode terminal 200 and a negative electrode terminal 201; a positive electrode current collector 120 and a negative electrode current collector 130; conductive members 300, 301; first fixing members 600, 601; second fixing members 800, 801 (see FIG. 3); and an electrode assembly 140.

A liquid such as an electrolyte solution (nonaqueous electrolyte) is filled in the container 100 of the energy storage device 10. However, the illustration of the liquid is omitted in the drawing. A kind of electrolyte solution filled in the container 100 is not particularly limited provided that the performance of the energy storage device 10 is not impaired, and various electrolyte solutions can be selectively used.

The container 100 is formed of a container body 111 having a bottomed rectangular cylindrical shape; and a lid body 110 formed of a plate-like member which closes an opening of the container body 111. The container 100 is configured such that the container 100 is hermetically sealed by joining the lid body 110 and the container body 111 to each other by welding or the like after the positive electrode current collector 120, the negative electrode current collector 130, the electrode assembly 140 and the like are housed inside the container 100. Although a material for forming the lid body 110 and a material for forming the container body 111 are not particularly limited, it is preferable that the lid body 110 and the container body 111 be made of weldable metal such as stainless steel, aluminum, an aluminum alloy, iron or a plated steel sheet, for example.

The electrode assembly 140 is a member which includes a positive electrode, a negative electrode and a separator, and can store electricity. The positive electrode is formed such that a positive active material layer is formed on a positive electrode base material foil which is a metal foil having an elongated strip shape and made of aluminum, an aluminum alloy or the like. The negative electrode is formed such that a negative active material layer is formed on a negative electrode base material foil which is a metal foil having an elongated strip shape and made of copper, a copper alloy or the like. The separator is formed using a microporous sheet made of a resin. In this embodiment, as a positive active material used for forming the positive active material layer or a negative active material used for forming the negative active material layer, known materials can be used as desired provided that the positive active material or the negative active material can occlude and discharge lithium ions.

The electrode assembly 140 is formed by winding a layered sheet which is formed of the negative electrode, the positive electrode and the separator sandwiched between the negative electrode and the positive electrode. The electrode assembly 140 is electrically connected to the positive electrode current collector 120 and the negative electrode current collector 130. In FIG. 2, the electrode assembly 140 having an elongated circular shape in cross section is shown. However, the electrode assembly 140 may have a circular shape or an elliptical shape in cross section. The electrode assembly 140 is not limited to an electrode assembly of a winding type, and may be an electrode assembly of a stacking type where plates having a flat plate shape are stacked in multiple layers.

The positive electrode terminal 200 is a terminal which is disposed outside the container 100, and is electrically connected to the positive electrode of the electrode assembly 140. The negative electrode terminal 201 is a terminal which is disposed outside the container 100, and is electrically connected to the negative electrode of the electrode assembly 140. That is, the positive electrode terminal 200 and the negative electrode terminal 201 are conductive electrode terminals through which electricity stored in the electrode assembly 140 is discharged to a space outside the energy storage device 10 and through which electricity is introduced into a space inside the energy storage device 10 for storing the electricity in the electrode assembly 140.

The positive electrode terminal 200 and the negative electrode terminal 201 are mounted on the lid body 110 disposed above the electrode assembly 140. To be more specific, the positive electrode terminal 200 is fixed to the lid body 110 together with the positive electrode current collector 120 by the conductive member 300. In the same manner, the negative electrode terminal 201 is fixed to the lid body 110 together with the negative electrode current collector 130 by the conductive member 301. The detailed configuration where the positive electrode terminal 200 and the negative electrode terminal 201 are fixed to the lid body 110 together with the positive electrode current collector 120 and the negative electrode current collector 130 is described later.

The positive electrode current collector 120 and the negative electrode current collector 130 are disposed inside the container 100, that is, are disposed on an inner surface (a surface on the minus side in the Z axis direction) of the lid body 110. To be more specific, the positive electrode current collector 120 is a current collector having conductivity and rigidity, and is disposed between the positive electrode of the electrode assembly 140 and a side wall of the container body 111, and is electrically connected to the positive electrode terminal 200 and the positive electrode of the electrode assembly 140. The negative electrode current collector 130 is a current collector having conductivity and rigidity, and is disposed between the negative electrode of the electrode assembly 140 and a side wall of the container body 111, and is electrically connected to the negative electrode terminal 201 and the negative electrode of the electrode assembly 140. In the same manner as the positive electrode base material foil of the electrode assembly 140, the positive electrode current collector 120 is made of aluminum, an aluminum alloy or the like. In the same manner as the negative electrode base material foil of the electrode assembly 140, the negative electrode current collector 130 is made of copper, a copper alloy or the like.

The conductive member 300 is a member which connects the positive electrode terminal 200 and the positive electrode current collector 120 to each other. The conductive member 301 is a member which connects the negative electrode terminal 201 and the negative electrode current collector 130 to each other. To be more specific, the conductive member 300 connects the positive electrode terminal 200 and the positive electrode current collector 120 to each other by being fixed to the lid body 110. The conductive member 301 connects the negative electrode terminal 201 and the negative electrode current collector 130 to each other by being fixed to the lid body 110. The conductive members 300, 301 are made of a conductive material such as metal. In the same manner as the positive electrode current collector 120 and the positive electrode base material foil of the electrode assembly 140, it is preferable that the conductive member 300 be made of aluminum, an aluminum alloy or the like. In the same manner as the negative electrode current collector 130 and the negative electrode base material foil of the electrode assembly 140, it is preferable that the conductive member 301 be made of copper, a copper alloy or the like.

The first fixing member 600 is a member which fixes the conductive member 300 and the positive electrode terminal 200 to each other by joining. The first fixing member 601 is a member which fixes the conductive member 301 and the negative electrode terminal 201 to each other by joining. The second fixing member 800 (see FIG. 3) is a member which fixes the conductive member 300 and the positive electrode current collector 120 to each other. The second fixing member 801 is a member which fixes the conductive member 301 and the negative electrode current collector 130 to each other.

The first fixing members 600, 601 and the second fixing members 800, 801 are made of a conductive material such as metal. In the same manner as the positive electrode current collector 120 and the positive electrode base material foil of the electrode assembly 140, it is preferable that the first fixing member 600 and the second fixing member 800 be made of aluminum, an aluminum alloy or the like. In the same manner as the negative electrode current collector 130 and the negative electrode base material foil of the electrode assembly 140, it is preferable that the first fixing member 601 and the second fixing member 801 be made of copper, a copper alloy or the like.

Next, the description is made with respect to the configuration where the positive electrode terminal 200 and the negative electrode terminal 201 are fixed to the lid body 110 together with the positive electrode current collector 120 and the negative electrode current collector 130 by the conductive members 300, 301. First, the configuration is schematically described. The configuration on the positive electrode terminal 200 side and the configuration on the negative electrode terminal 201 side are substantially equal to each other. Accordingly, the configuration on the positive electrode terminal 200 side is mainly described hereinafter, and the description of the configuration on the negative electrode terminal 201 side is omitted or simplified.

Figure 3:
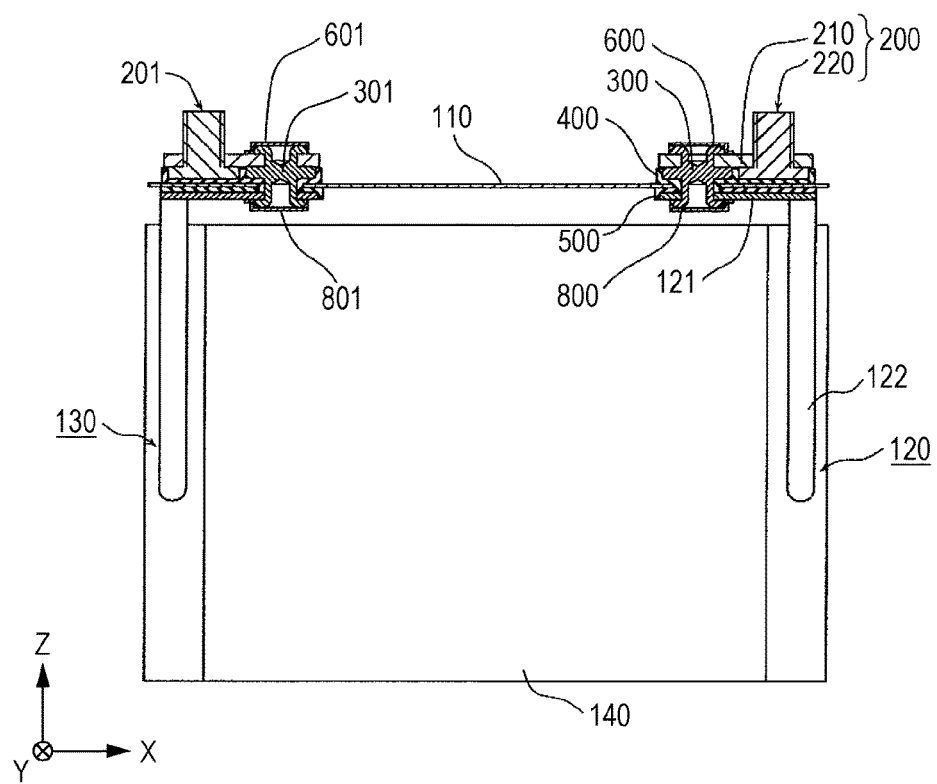
FIG. 3 is a cross-sectional view showing the configuration of the energy storage device where a positive electrode terminal and a negative electrode terminal are fixed to a lid body together with a positive electrode current collector and a negative electrode current collector.

FIG. 3 is a cross-sectional view showing the configuration in the embodiment of the present invention where the positive electrode terminal 200 and the negative electrode terminal 201 are fixed to the lid body 110 together with the positive electrode current collector 120 and the negative electrode current collector 130. To be more specific, FIG. 3 is a cross-sectional view of the energy storage device 10 shown in FIG. 2 taken along a plane parallel to an XZ plane including a line III-III, and showing the configuration of the positive electrode terminal 200 and the negative electrode terminal 201 and constitutional parts around the positive electrode terminal 200 and the negative electrode terminal 201.

As shown in FIG. 3, the energy storage device 10 further includes a first sealing member 400 and a second sealing member 500 on the side where the positive electrode terminal 200 and the positive electrode current collector 120 are disposed. The positive electrode terminal 200 includes a connecting portion 210 and a connecting bolt 220. On the other hand, the positive electrode current collector 120 includes: a terminal side disposed portion 121 having a flat plate shape and connected to the positive electrode terminal 200 by way of the conductive member 300; and two electrode assembly connecting portions 122 joined to the electrode assembly 140.

The connecting portion 210 of the positive electrode terminal 200 is a body portion of the electrode terminal disposed outside the container 100. That is, the connecting portion 210 is a body of the positive electrode terminal 200, and is disposed above the lid body 110 (on the plus side in the Z axis direction). The connecting portion 210 is made of a conductive material such as metal (aluminum, for example).

Figure 4:
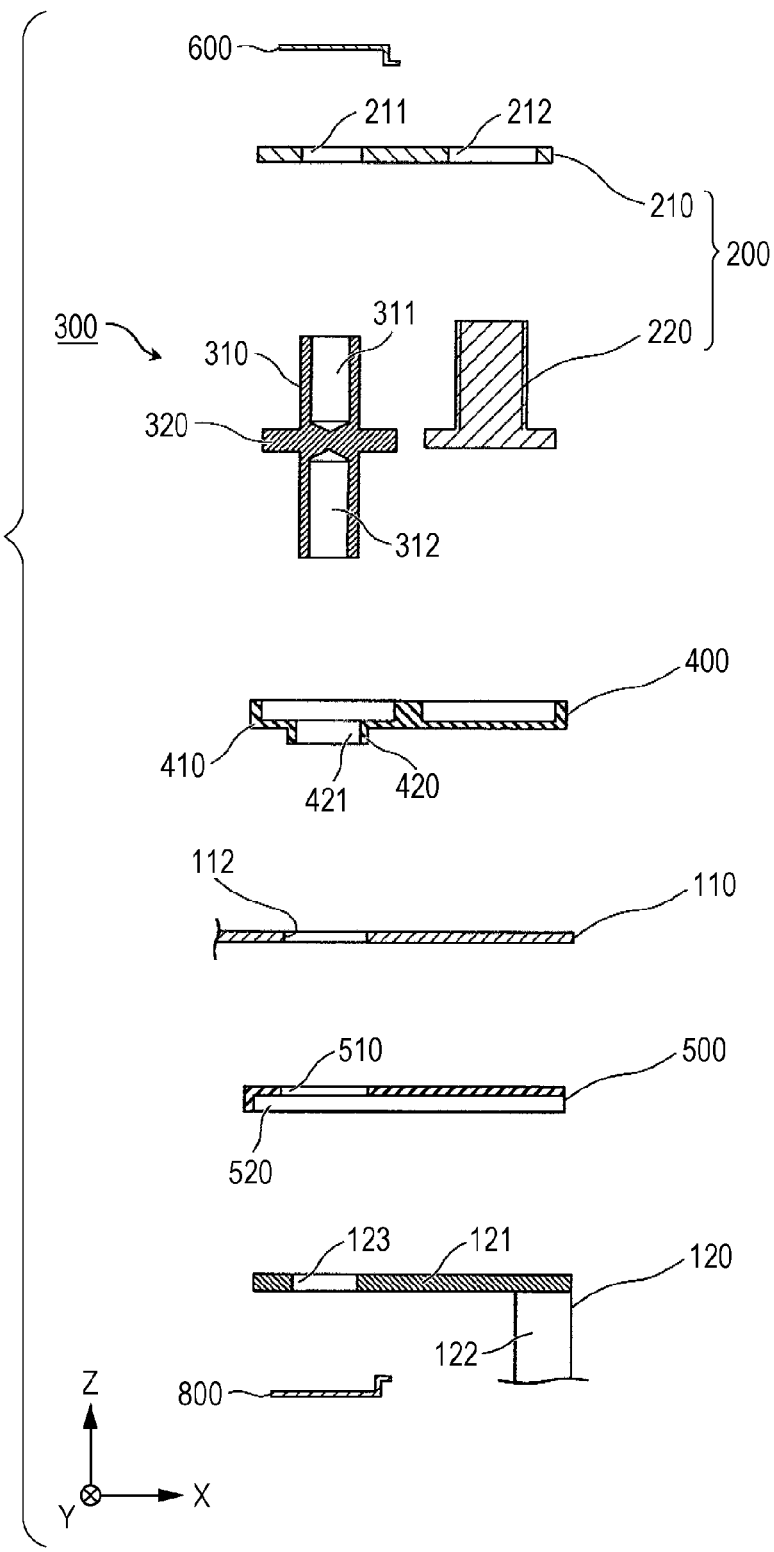
FIG. 4 is an exploded view showing the respective constitutional elements in a state where the positive electrode terminal and constitutional elements around the positive electrode terminal of the energy storage device are disassembled.

The connecting portion 210 is fixed to the lid body 110 together with the terminal side disposed portion 121 of the positive electrode current collector 120 by the conductive member 300. The connecting bolt 220 is a bolt-shaped member disposed so as to project to the outside of the container 100 through a first opening portion 212 formed in the connecting portion 210 (see FIG. 4), and is connected to a bus bar (not shown in the drawing) which connects electrode terminals of the energy storage devices 10 to each other. The connecting bolt 220 is made of a conductive material such as metal (aluminum or stainless steel, for example).

The first sealing member 400 is a gasket having at least a portion thereof disposed between the positive electrode terminal 200 and the lid body 110. It is preferable that the first sealing member 400 be made of an insulating material having lower rigidity than the lid body 110. For example, the first sealing member 400 is made of a resin such as polyphenylene sulfide (PPS) or polypropylene (PP).

The second sealing member 500 is a gasket having at least a portion thereof disposed between the terminal side disposed portion 121 of the positive electrode current collector 120 and the lid body 110. It is preferable that the second sealing member 500 be made of an insulating material having lower rigidity than the lid body 110. For example, the second sealing member 500 is made of a resin such as polyphenylene sulfide (PPS) or polypropylene (PP).

The first fixing member 600 covers the conductive member 300 on the positive electrode terminal 200 side from the outside of the container 100, and is fixed to the connecting portion 210 of the positive electrode terminal 200.

The second fixing member 800 covers the conductive member 300 on the positive electrode terminal 200 side from the inside of the container 100, and is fixed to the terminal side disposed portion 121 of the positive electrode current collector 120.

Next, the description is made with respect to the detail of the configuration where the positive electrode terminal 200 is fixed to the lid body 110 together with the positive electrode current collector 120 by the conductive member 300. The configuration on the positive electrode terminal 200 side and the configuration on the negative electrode terminal 201 side are substantially equal to each other. Accordingly, the configuration on the positive electrode terminal 200 side is mainly described hereinafter, and the description of the configuration on the negative electrode terminal 201 side is omitted or simplified.

Figure 5:
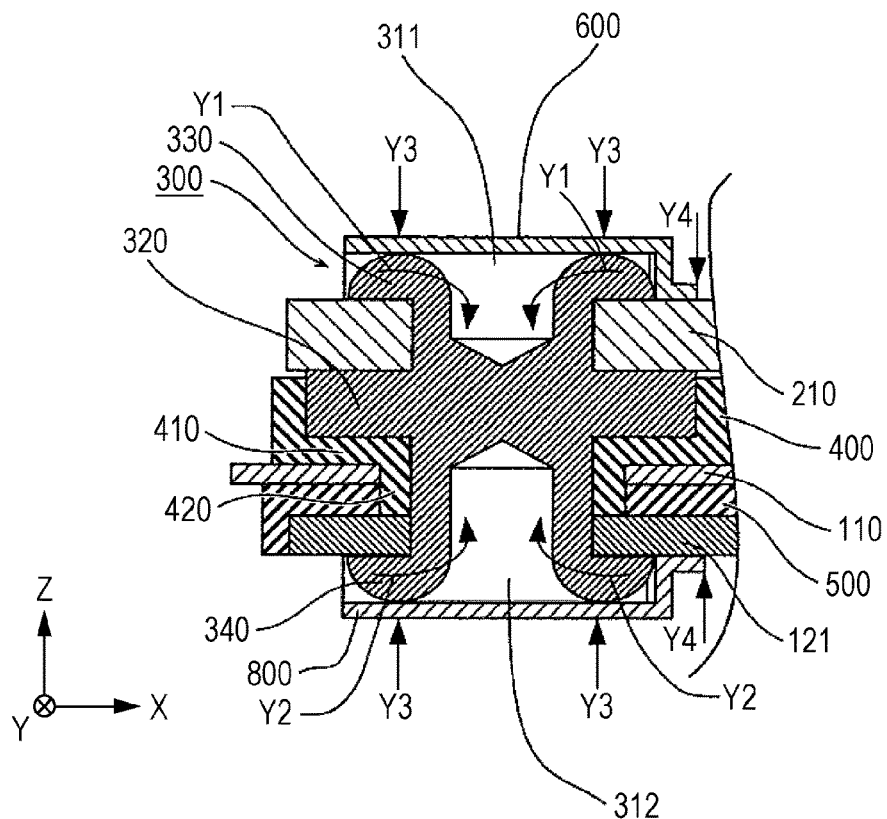
FIG. 5 is a cross-sectional view showing the configuration of a portion of the energy storage device where the positive electrode terminal is fixed to the lid body together with the positive electrode current collector.

FIG. 5 is a cross-sectional view showing the configuration in the embodiment of the present invention where the positive electrode terminal 200 is fixed to the lid body 110 together with the positive electrode current collector 120. To be more specific, FIG. 5 is an enlarged cross-sectional view showing the configuration of the positive electrode terminal 200 shown in FIG. 3 and constitutional parts around the positive electrode terminal 200 in an enlarged manner.

As shown in FIG. 5, a plate-like portion 410 of the first sealing member 400 is disposed between the connecting portion 210 of the positive electrode terminal 200 and the lid body 110 and between a flange portion 320 of the conductive member 300 and the lid body 110. The plate-like portion 410 is disposed in contact with the lid body 110. It is sufficient that the plate-like portion 410 is disposed between the lid body 110 and at least one of the connecting portion 210 and the flange portion 320.

A cylindrical portion 420 penetrates the lid body 110 and the second sealing member 500, and is disposed around the conductive member 300. The second sealing member 500 is disposed between the terminal side disposed portion 121 of the positive electrode current collector 120 and the lid body 110. The second sealing member 500 is disposed in contact with the lid body 110.

A pillar portion 310 of the conductive member 300 is disposed in a state where the pillar portion 310 penetrates the connecting portion 210, the lid body 110, the first sealing member 400, the second sealing member 500, and the terminal side disposed portion 121 of the positive electrode current collector 120. The conductive member 300 fixes the connecting portion 210 and the positive electrode current collector 120 to the lid body 110. To be more specific, the first sealing member 400 and the second sealing member 500 which sandwich the lid body 110 therebetween are disposed between the connecting portion 210 and the terminal side disposed portion 121 of the positive electrode current collector 120. The connecting portion 210 and the terminal side disposed portion 121 of the positive electrode current collector 120 are sandwiched by the conductive member 300.

The connecting portion 210 and the terminal side disposed portion 121 are fixed to the lid body 110 by being swaged by the conductive member 300 which functions as a rivet in a state where the first sealing member 400, the lid body 110 and the second sealing member 500 are sandwiched between the connecting portion 210 and the terminal side disposed portion 121. In such a fixing operation, an upper portion and a lower portion of the conductive member 300 are swaged and hence, an upper space 311 and a lower space 312 of the pillar portion 310 are expanded outward, and an upper end portion and a lower end portion of the pillar portion 310 are pressed so as to expand outward. As a result, a first projecting portion 330 and a second projecting portion 340 are formed.

That is, the first projecting portion 330 and the second projecting portion 340 are swaged portions formed by caulking the conductive member 300, and are disposed in a projecting manner along the lid body 110 so as to sandwich the lid body 110 therebetween. To be more specific, the first projecting portion 330 is an annular swaged portion which is disposed at an end portion of the conductive member 300 on the positive electrode terminal 200 side (the plus side in the Z axis direction), that is, at a position outside the container 100 and above the connecting portion 210. The second projecting portion 340 is an annular swaged portion which is disposed at an end portion of the conductive member 300 on the positive electrode current collector 120 side (the minus side in the Z axis direction), that is, at a position inside the container 100 and below the terminal side disposed portion 121.

With such a configuration, the connecting portion 210 and the first sealing member 400 are disposed and fixed between the first projecting portion 330 and the lid body 110. In the same manner, the terminal side disposed portion 121 of the positive electrode current collector 120 and the second sealing member 500 are disposed and fixed between the second projecting portion 340 and the lid body 110.

The first fixing member 600 is fixed to a flat portion of the connecting portion 210 in a state where the first fixing member 600 covers the first projecting portion 330 of the conductive member 300 from the outside of the container 100, and is brought into contact with the first projecting portion 330. The second fixing member 800 is fixed to a flat portion of the terminal side disposed portion 121 of the positive electrode current collector 120 in a state where the second fixing member 800 covers the second projecting portion 340 of the conductive member 300 from the inside of the container 100, and is brought into contact with the second projecting portion 340. With such a configuration, the positive electrode terminal 200 and the positive electrode current collector 120 are joined to the conductive member 300 by the first fixing member 600 and the second fixing member 800, respectively.

Next, the first fixing member 600 is described in detail. Although an object to be fixed by the first fixing member 600 and an object to be fixed by the second fixing member 800 differ from each other, the first fixing member 600 and the second fixing member 800 have substantially the same configuration. Accordingly, the first fixing member 600 is mainly described hereinafter, and the description of the second fixing member 800 is omitted or simplified.

Figure 6:
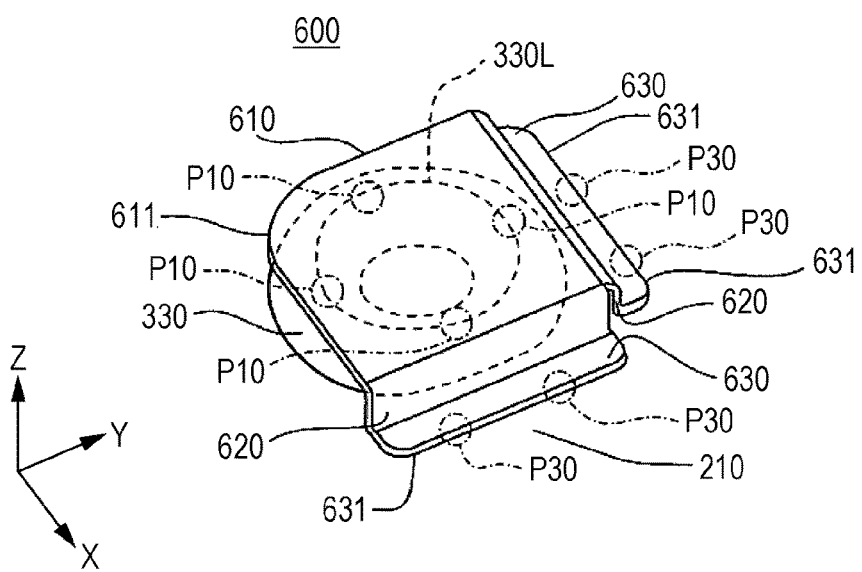
FIG. 6 is a perspective view showing the schematic configuration of a first fixing member in the energy storage device.
Figure 7:
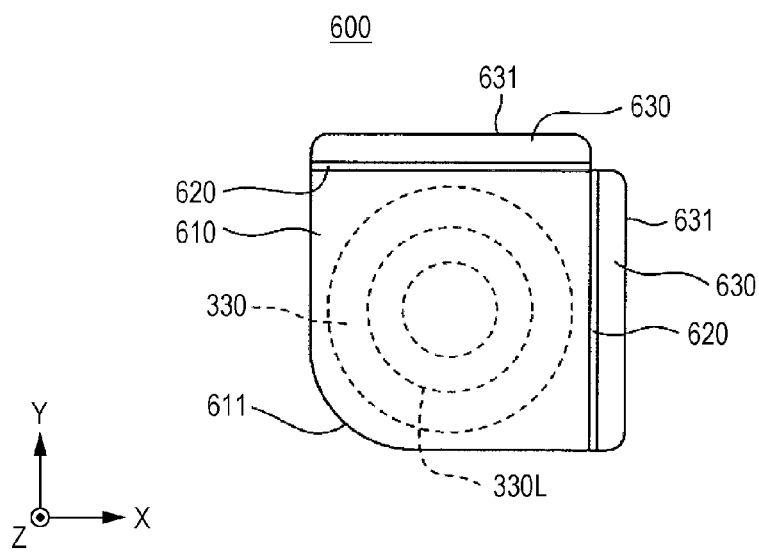
FIG. 7 is a plan view of the first fixing member in the energy storage device.

FIG. 6 is a perspective view showing the schematic configuration of the first fixing member 600 in this embodiment. FIG. 7 is a plan view of the first fixing member 600 in this embodiment. As shown in FIG. 6 and FIG. 7, the first fixing member 600 is formed into an approximately rectangular shape as viewed in a plan view using a sheet metal which is a plate body. The first fixing member 600 includes a cover portion 610, wall portions 620 and contact portions 630.

The cover portion 610 is a portion which covers the first projecting portion 330 of the conductive member 300 from the outside of the lid body 110. The cover portion 610 is formed into an approximately rectangular shape as viewed in a plan view. One corner portion 611 of the cover portion 610 is formed into an arcuate shape. The cover portion 610 is brought into contact with a ridge 330L of the first projecting portion 330.

The wall portions 620 are bent portions formed by bending two different sides of the cover portion 610 toward the connecting portion 210. To be more specific, the wall portions 620 are formed on two sides of the cover portion 610. On two sides of the cover portion 610 on which the wall portion 620 is not formed, a gap is formed between the cover portion 610 and the connecting portion 210. By forming such a gap, a contact state between the cover portion 610 and the first projecting portion 330 can be visually recognized and hence, a checking operation can be easily performed at the time of assembling the energy storage device or performing maintenance of the energy storage device.

The contact portions 630 are bent portions formed by bending distal ends of the wall portions 620 toward the outside such that the contact portions 630 extend parallel to the cover portion 610. The contact portions 630 are fixed to the connecting portion 210 in a face contact manner. In this embodiment, the description has been made by exemplifying the case where the first fixing member 600 includes four bent portions (two wall portions 620 and two contact portions 630). However, it is sufficient that the first fixing member 600 includes two or more bent portions.

The first fixing member 600 is fixed to the first projecting portion 330 and to the connecting portion 210 by welding the cover portion 610 and the contact portion 630 to the first projecting portion 330 and to the connecting portion 210, respectively. To be more specific, as shown in FIG. 6, four portions P10 of the cover portion 610 which correspond to the ridge 330L of the first projecting portion 330 are welded to the first projecting portion 330. For example, laser welding or the like is performed as welding. In performing laser welding, a laser beam is irradiated in the direction indicated by arrows Y3 in FIG. 5. A laser beam can be irradiated to flat portions of the cover portion 610 and hence, welding can be easily performed satisfactorily.

As shown in FIG. 6, two portions P30 of each contact portion 630 which correspond to an edge 631 are welded to the connecting portion 210. Accordingly, at least two different sides of the first fixing member 600 are welded to the connecting portion 210. In performing laser welding, a laser beam is irradiated in the directions indicated by arrows Y4 in FIG. 5. A laser beam can be irradiated to the contact portions 630 each having a flat shape as a whole and hence, welding can be easily performed satisfactorily. Even in the case where a laser beam is irradiated to a boundary between the contact portion 630 and the connecting portion 210, there is no large stepped portion between the contact portion 630 and the connecting portion 210 and hence, welding can be easily performed satisfactorily.

As described above, laser welding can be performed by irradiating a laser beam to the flat portion of the cover portion 610 and the flat portions of the contact portions 630. On the other hand, when laser welding is performed by directly irradiating a laser beam to a bent portion of the first projecting portion 330 or the like without using the first fixing member 600, a portion to be irradiated is unstable and hence, welding strength becomes unstable. In this embodiment, a laser beam is irradiated to the flat portions or to the portions having small stepped portion and hence, welding can be performed stably whereby sufficient welding strength can be acquired. As a result, the rotation and the deformation of the conductive member 300 caused by vibrations or an impact can be suppressed with certainty and hence, it is possible to prevent a conduction defect (the increase of electric resistance) caused by loosening brought about by the rotation or the deformation of the conductive member 300.

When the connecting portion 210 and the conductive member 300 are directly welded to each other, due to an effect of a shape of the conductive member 300 (a bent shape of the first projecting portion 330 formed by swaging, for example), there is a possibility that welding is performed unstably. However, as in the case of this embodiment, by adopting the configuration where the connecting portion 210 and the conductive member 300 are welded to the first fixing member 600, the first fixing member 600 can be formed into a shape which facilitates welding. The shape which facilitates welding corresponds to, for example, the flat shape of the portions of the first fixing member 600 (the cover portion 610 and the contact portions 630) as described above. When welding can be easily performed with the provision of the first fixing member 600, welding can be performed stably. By performing welding stably, the connecting portion 210 and the conductive member 300 can be joined to the first fixing member 600 with certainty and hence, loosening of the conductive member 300 can be further suppressed. The same goes for the second fixing member 800.

The first fixing member 600 includes two or more bent portions (the wall portions 620 and the contact portions 630) corresponding to a height of the first projecting portion 330. With such a configuration, welding between the first projecting portion 330 and the first fixing member 600 and welding between the connecting portion 210 and the first fixing member 600 can be performed easily and hence, welding can be performed stably.

The first projecting portion 330 of the conductive member 300 is fixed to the connecting portion 210 by the first fixing member 600. When vibration or an impact is applied to the energy storage device, there may be a case where a stress as indicated by arrows Y1 in FIG. 5 is applied to the first projecting portion 330 of the conductive member 300. In this embodiment, with the provision of the first fixing member 600, even when a force in the direction indicated by the arrows Y1 is applied to the first projecting portion 330, the first fixing member 600 restricts the deformation of the first projecting portion 330 in such a direction. Accordingly, a fastening force of the first projecting portion 330 can be maintained.

In the configuration where the end portion of the conductive member 300 is swaged, when the connection between the connecting portion 210 or the positive electrode current collector 120 and the conductive member 300 is loosened, loosening cannot be eliminated by fastening the swaged portion again. On the other hand, in this embodiment, even with the configuration where the end portion of the conductive member 300 is swaged, the first fixing member 600 can suppress the occurrence of loosening of the connection between the conductive member 300 and the connecting portion 210. Accordingly, even when a battery where the end portion of the conductive member 300 is swaged is used for a long time, the increase of electric resistance caused by such loosening can be suppressed. That is, in the configuration where the conductive member 300 is joined by caulking, an advantageous effect brought about by the use of the first fixing member 600 is large.

The first fixing member 600 is made of metal and hence, conductivity between the connecting portion 210 of the positive electrode terminal 200 and the conductive member 300 can be increased. In the same manner, the second fixing member 800 is made of metal and hence, conductivity between the terminal side disposed portion 121 of the positive electrode current collector 120 and the conductive member 300 can be increased. Since the first fixing member 600 and the second fixing member 800 are made of metal, the first fixing member 600 and the second fixing member 800 can be fixed to the conductive member 300 by welding.

It is preferable that a thickness of the first fixing member 600 or a thickness of the second fixing member 800 be set to a value not less than 0.3 mm and not more than 1.5 mm. When the thickness of the first fixing member 600 or the thickness of the second fixing member 800 is set to less than 0.3 mm, the first fixing member 600 or the second fixing member 800 per se is liable to be deformed and hence, an effect of efficiently suppressing the rotation or the deformation of the conductive member 300 becomes small. On the other hand, when the thickness of the first fixing member 600 or the thickness of the second fixing member 800 is set to more than 1.5 mm, laser welding does not sufficiently reach the conductive member 300 and hence, there is a possibility that a joining force becomes weak.

(Modification 1)

Next, a modification 1 of the above-mentioned embodiment is described. In this modification, a through hole is formed in the first fixing member and in the second fixing member respectively. In the description made hereinafter, parts identical to the parts in the above-mentioned embodiment are given the same symbols (numerical references), and the description of such parts may be omitted.

Figure 8:
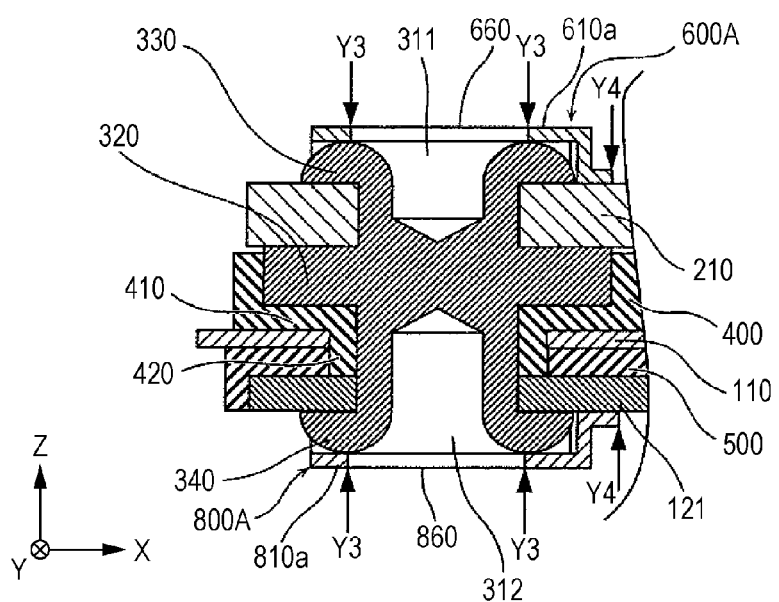
FIG. 8 is a cross-sectional view showing the schematic configuration of a conductive member, a first fixing member and a second fixing member in an energy storage device of a modification 1.

FIG. 8 is a cross-sectional view showing the schematic configuration of the conductive member 300, a first fixing member 600A and a second fixing member 800A in the modification 1. To be more specific, FIG. 8 is a view which corresponds to FIG. 5.

As shown in FIG. 8, a through hole 660 is formed in a cover portion 610a of the first fixing member 600A. The through hole 660 is an opening having a circular shape as viewed in a top view. To be more specific, the through hole 660 has a circular shape substantially coaxial with a circular shape of a ridge 300L of a first projecting portion 330, and has substantially the same size as the circular shape of the ridge 300L. By forming the through hole 660 in the cover portion 610a, a portion to be irradiated by a laser beam can be clearly observed. Further, welding can be applied to a boundary portion between a portion of a periphery of the through hole 660 and the first projecting portion 330 of the conductive member 300 and hence, the conductive member 300 and the first fixing member 600A can be welded to each other more firmly.

(Modification 2)

Next, a modification 2 of the above-mentioned embodiment is described. In this modification, one fixing member is provided to one conductive member. In the description made hereinafter, parts identical to the parts in the above-mentioned embodiment and modification are given the same symbols, and the description of such parts may be omitted.

Figure 9:
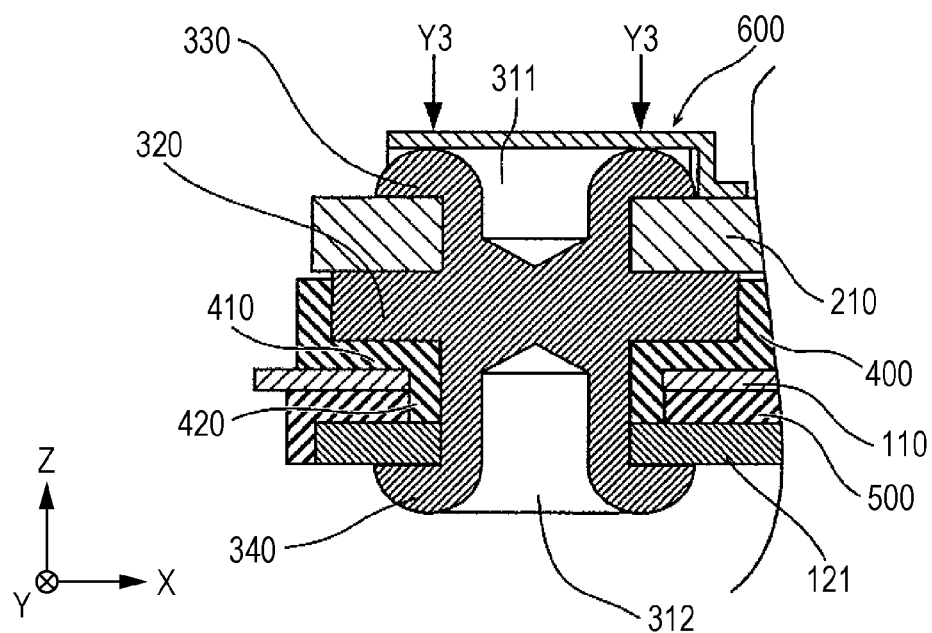
FIG. 9 is a cross-sectional view showing the schematic configuration of a conductive member and a first fixing member in an energy storage device of a modification 2.
Figure 10:
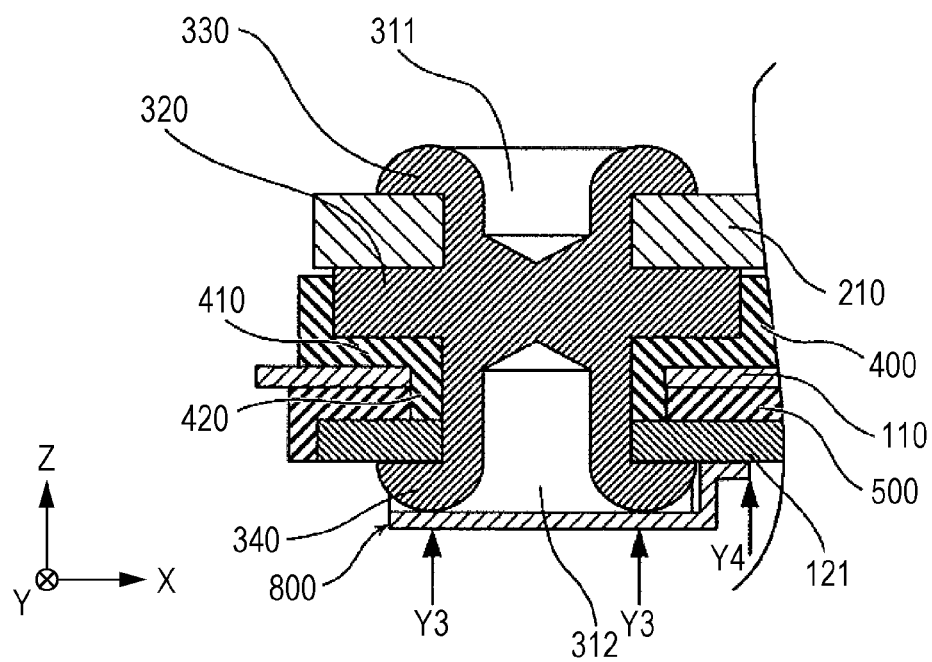
FIG. 10 is a cross-sectional view showing the schematic configuration of the conductive member and a second fixing member in the energy storage device of the modification 2.

FIG. 9 is a cross-sectional view showing the schematic configuration of a conductive member 300 and a first fixing member 600 in one example of the modification 2. Although the first fixing member 600 is mounted on the conductive member 300 shown in FIG. 9, a second fixing member 800 is not mounted on the conductive member 300 shown in FIG. 9. FIG. 10 is a cross-sectional view showing the schematic configuration of a conductive member 300 and a second fixing member 800 in another example of the modification 2. Although the second fixing member 800 is mounted on the conductive member 300 shown in FIG. 10, a first fixing member 600 is not mounted on the conductive member 300 shown in FIG. 10. Which one of the first fixing member 600 and the second fixing member 800 is to be mounted on the conductive member 300 may be determined by taking into account a use environment, a design condition, specification or the like of the energy storage device 10.

However, as in the case of the above-mentioned embodiment, loosening of the conductive member 300 or sealing deterioration caused by such loosening can be prevented by fixing the conductive member 300 to both an outer side and an inner side of the energy storage device 10 using the first fixing member 600 and the second fixing member 800.

(Modification 3)

Next, a modification 3 of the above-mentioned embodiment is described. In this modification, only one side of a first fixing member is welded to a connecting portion 210. In the description made hereinafter, parts identical to the parts in the above-mentioned embodiment are given the same symbols, and the description of such parts may be omitted.

Figure 11:
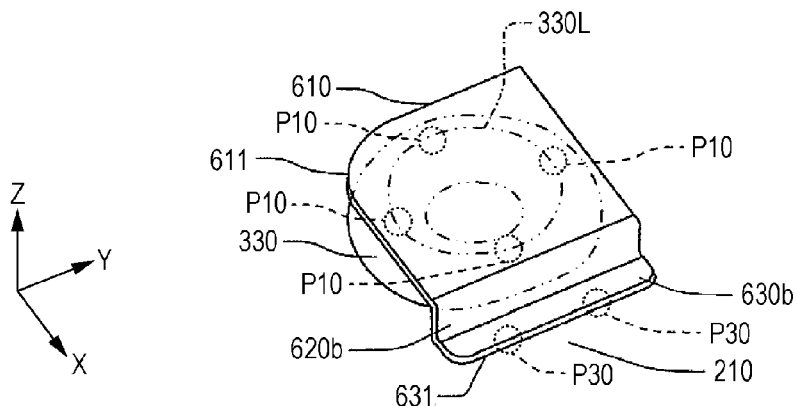
FIG. 11 is a perspective view showing the schematic configuration of a first fixing member in an energy storage device of a modification 3.

FIG. 11 is a perspective view showing the schematic configuration of a first fixing member 600B in the modification 3. As shown in FIG. 11, a wall portion 620b of the first fixing member 600B is formed by bending one side of the cover portion 610 toward the connecting portion 210. A contact portion 630b which is brought into surface contact with the connecting portion 210 is formed on a distal end portion of the wall portion 620b. Two portions P30 of the contact portion 630b which correspond to an edge 631 are welded to the connecting portion 210. In this manner, by welding at least one side of the first fixing member 600B to the connecting portion 210, conductive member 300 and the positive electrode terminal 200 can be fixed to each other by way of the first fixing member 600B.

(Modification 4)

Next, a modification 4 of the above-mentioned embodiment is described. In this modification, portions of a periphery of a first fixing member are joined to a conductive member. In the description made hereinafter, parts identical to the parts in the above-mentioned embodiment are given the same symbols, and the description of such parts may be omitted.

Figure 12:
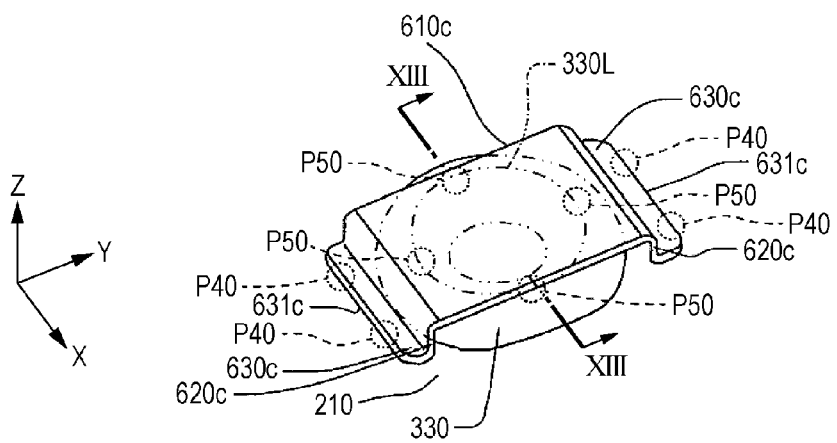
FIG. 12 is a perspective view showing the schematic configuration of a first fixing member in an energy storage device of a modification 4.
Figure 13:
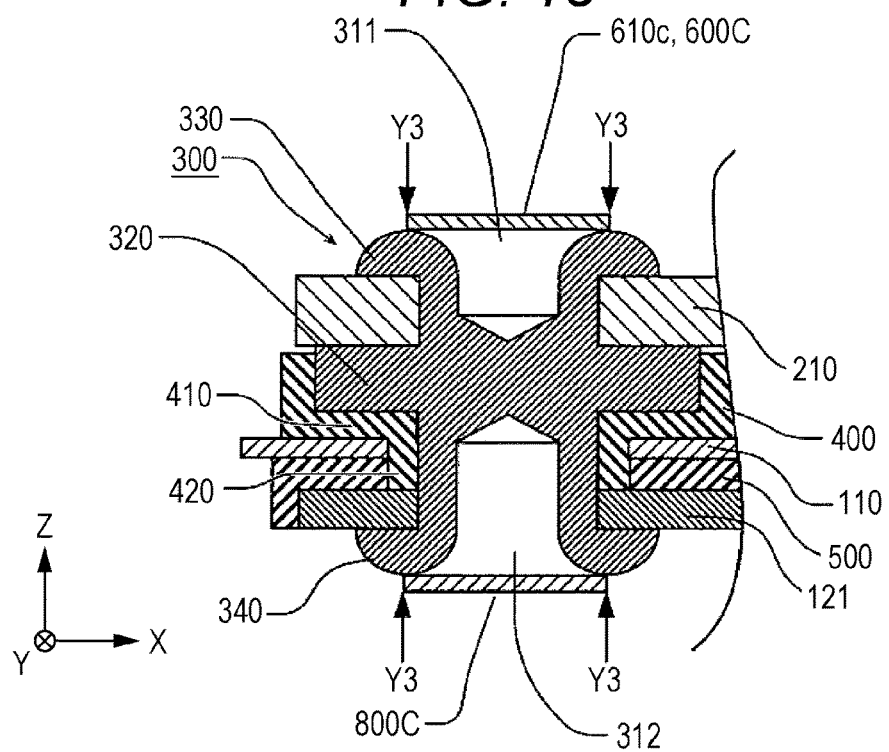
FIG. 13 is a cross-sectional view showing the schematic configuration of a conductive member, the first fixing member and a second fixing member in the energy storage device of the modification 4.

FIG. 12 is a perspective view showing the schematic configuration of a first fixing member 600C in the modification 4. FIG. 13 is a cross-sectional view showing the schematic configuration of a conductive member 300, a first fixing member 600C and a second fixing member 800C in the modification 4. To be more specific, FIG. 13 is a cross-sectional view taken along a plane parallel to an XZ plane including a line XIII-XIII in FIG. 12. The second fixing member 800C has substantially the same configuration as the first fixing member 600C and hence, the description of the second fixing member 800C is omitted here.

As shown in FIG. 12 and FIG. 13, the first fixing member 600C is formed into an approximately rectangular shape as viewed in a plan view using a sheet metal which is a plate body. The first fixing member 600C includes a cover portion 610c, wall portions 620c, and contact portions 630c.

The cover portion 610c is a portion which covers a first projecting portion 330 of the conductive member 300 from the outside of the lid body 110. The cover portion 610 is formed in an approximately rectangular shape as viewed in a plan view, and is brought into contact with a ridge 330L of the first projecting portion 330.

The first fixing member 600C is fixed to the first projecting portion 330 and the connecting portion 210 due to the welding of the cover portion 610c and the contact portions 630c. In this modification, with respect to the welding between the cover portion 610c and the first projecting portion 330, a periphery of the cover portion 610c and the ridge 330L of the first projecting portion 330 are welded to each other. With such a configuration, the ridge 330L can be observed and hence, a laser beam can be irradiated to portions to be welded with less error. Further, a boundary portion between a portion of the periphery of the cover portion 610c and the first projecting portion 330 of the conductive member 300 can be welded and hence, the conductive member 300 and the first fixing member 600A can be welded to each other more firmly.

(Modification 5)

Next, a modification 5 of the above-mentioned embodiment is described. In this modification, a first fixing member having a flat plate shape is joined to a conductive member. In the description made hereinafter, parts identical to the parts in the above-mentioned embodiment are given the same symbols, and the description of such parts may be omitted.

Figure 14:
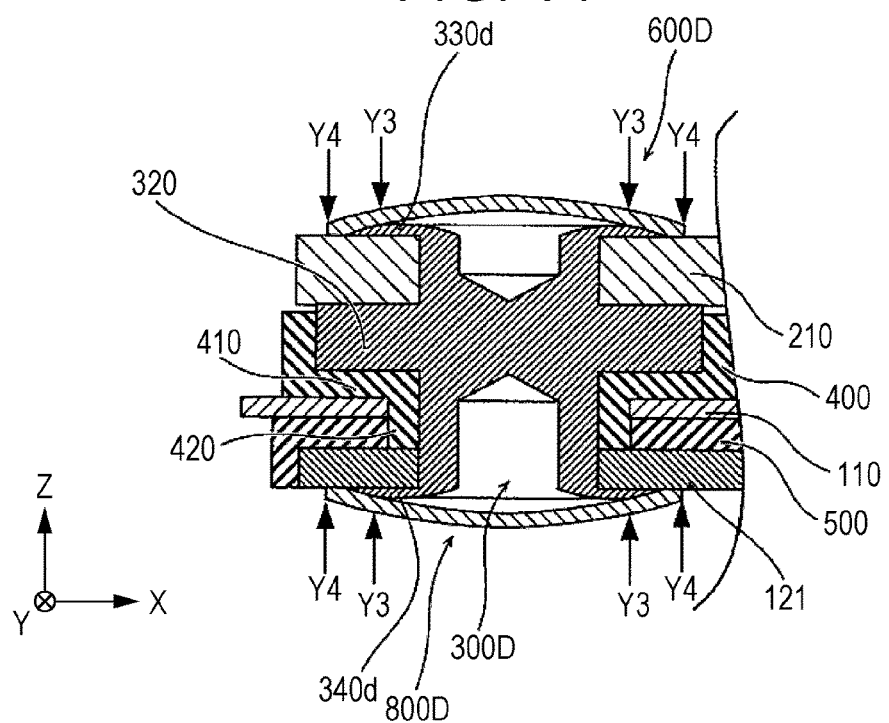
FIG. 14 is a cross-sectional view showing the schematic configuration of a conductive member, a first fixing member and a second fixing member in an energy storage device of a modification 5.

FIG. 14 is a cross-sectional view showing the schematic configuration of a conductive member 300D, a first fixing member 600D and a second fixing member 800D in the modification 5. The second fixing member 800D has substantially the same configuration as the first fixing member 600D and hence, the description of the second fixing member 800D is omitted here. Further, in the modification 5, a height of a first projecting portion 330d of the conductive member 300D is set lower than a height of the first projecting portion 330 of the conductive member 300 in the embodiment. In the same manner, a height of a second projecting portion 340d of the conductive member 300D is set lower than a height of the second projecting portion 340 of the conductive member 300 in the embodiment.

The first fixing member 600D is a plate body which has an approximately rectangular shape as viewed in a plan view and has resiliency. As shown in FIG. 14, the first fixing member 600D covers the first projecting portion 330d of the conductive member 300D from the outside of a lid body 110. In such a configuration, the first fixing member 600D is bent as a whole, and both end portions of the first fixing member 600D are brought into contact with the connecting portion 210, and portions of the first fixing member 600D disposed more inside both end portions are brought into contact with the first projecting portion 330d. The first fixing member 600D is fixed by being welded to the first projecting portion 330d and the connecting portion 210. In this manner, in the case where the height of the first projecting portion 330d is low, even when bending working is not applied to the first fixing member 600D, with the use of a plate body having resiliency, the welding between the first projecting portion 330d and the first fixing member 600D and the welding between the connecting portion 210 and the first fixing member 600D can be easily performed.

The energy storage devices of the embodiment according to the present invention and the modification of the embodiment have been described heretofore. However, the present invention is not limited to the above-mentioned embodiment and modifications of the embodiment. It should be construed that the embodiment and the modifications of the embodiment which are disclosed in this specification are provided only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention.

For example, in the above-mentioned embodiment and modifications of the embodiment, the conductive member 300 is formed of a hollow rivet. However, the conductive member 300 may be formed of a solid rivet.

In the above-mentioned embodiment and modifications of the embodiment, the positive electrode terminal 200 includes the connecting bolt 220. However, the positive electrode terminal 200 may not include the connecting bolt. For example, a bus bar may be directly welded to the connecting portion 210. The same goes for the negative electrode terminal 201 side.

In the above-mentioned embodiment and modifications of the embodiment, with respect to the welding between the connecting portion 210 of the positive electrode terminal 200 and the conductive member 300 and the welding between the positive electrode current collector 120 and the conductive member 300, the portions to be welded and the number of portions to be welded are described. However, the present invention is not limited to such configurations. The portions to be welded and the number of portions to be welded may be set as desired.

In the above-mentioned embodiment and modifications of the embodiment, the description has been made by exemplifying the case where the first fixing member 600 and the second fixing member 800 have an approximately rectangular shape as viewed in a plan view. However, the first fixing member and the second fixing member may have any shape. From a viewpoint of stably fixing an object to be fixed, it is preferable that the first fixing member and the second fixing member have an approximately polygonal shape. It is not necessary for the first fixing member and the second fixing member to have an accurate polygonal shape, and it is sufficient for the first fixing member and the second fixing member to have an approximately polygonal outer shape as viewed in a plan view. That is, respective sides of a polygonal shape may not have a linear shape as viewed in a plan view, but may have a curved shape. Further, provided that the fixing member appears to have an approximately polygonal outer shape as viewed in a plan view as in the case of the above-mentioned first fixing member 600, a corner portion of the fixing member may be bent or a stepped portion may be formed on an outer periphery of the fixing member.

In the above-mentioned embodiment and modifications of the embodiment, the description has been made by exemplifying the case where the first fixing member 600 and the second fixing member 800 are formed using a sheet metal. However, the first fixing member 600 and the second fixing member 800 may be formed using materials other than a sheet metal. For example, the first projecting portion 330 and the second projecting portion 340 may be fixed using a first fixing member and a second fixing member which are formed using at least one wire-like member.

In the above-mentioned embodiment and modifications of the embodiment, the description has been made by exemplifying the case where the fixing members (the first fixing member 600 and the second fixing member 800) are made of metal. However, the fixing members may be made of a resin such as polyphenylene sulfide (PPS), for example. When the fixing members are made of a resin, the fixing members may be fixed to an object to be fixed by an adhesive agent instead of welding the fixing members to the object to be fixed. It is preferable to use an adhesive agent which is not affected by an electrolyte solution with respect to a fixing member disposed inside the container 100.

The configurations which are formed by arbitrarily combining the above-mentioned embodiment and modifications are also included in the scope of the present invention.

INDUSTRIAL APPLICABILITY

The present invention can provide an energy storage device which can maintain energy storage performance for a long period.

What is claimed is:

1. An energy storage device, comprising:
   a container;
   a terminal disposed outside the container or a current collector disposed inside the container;
   a conductive member penetrating the container in a first direction and connected to the current collector or the terminal; and
   a fixing member joining the current collector or the terminal and the conductive member to each other,
   wherein an end portion of the conductive member is swaged,
   wherein, along the first direction, the fixing member covers and directly contacts with, from an outside of the container, an uppermost surface of the end portion of the conductive member which is swaged or, along a direction opposite to the first direction, the fixing member covers and directly contacts with, from an inside of the container, a lowermost surface the end portion of the conductive member which is swaged.

2. The energy storage device according to claim 1, wherein the terminal or the current collector is fixed between the end portion of the conductive member and the container.

3. The energy storage device according to claim 1, wherein the fixing member includes a plate body, and at least two different sides of the plate body are joined to the current collector or the terminal.

4. The energy storage device according to claim 1, wherein the energy storage device includes the terminal and the current collector, the terminal and the current collector are connected to each other by the conductive member, and the terminal and the current collector are joined to the conductive member by the fixing member.

5. The energy storage device according to claim 1, wherein a through hole is formed in the fixing member, and a portion of a periphery of the through hole and the conductive member are joined to each other.

6. The energy storage device according to claim 1, wherein the fixing member includes a plate body, and a portion of a periphery of the plate body and the conductive member are joined to each other.

7. The energy storage device according to claim 1, wherein the fixing member includes a plate body, and comprises two or more bent portions.

8. The energy storage device according to claim 1, wherein the fixing member is welded with the conductive member.

9. The energy storage device according to claim 1, wherein, in the first direction, the fixing member covers the end portion of the conductive member from the outside of the container.

10. The energy storage device according to claim 1, wherein the terminal is disposed outside the container, and
    wherein the fixing member joins the terminal and the conductive member to each other.

11. The energy storage device according to claim 10, wherein the fixing member covers the conductive member along the first direction.

12. The energy storage device according to claim 10, wherein the fixing member, the end portion, and a connecting portion of the terminal are disposed in this order in the first direction.

13. The energy storage device according to claim 1,
    wherein the current collector is disposed inside the container,
      wherein the fixing member covers, from an inside of the container, the end portion of the conductive member which is swaged.

14. The energy storage device according to claim 13, wherein, along the direction opposite to the first direction, the fixing portion covers the conductive member.

15. The energy storage device according to claim 13, wherein the fixing portion abuts a surface of the conductive member.

16. The energy storage device according to claim 13, wherein the fixing member includes a first fixing member and a second fixing member, the first fixing member joining the current collector and the conductive member to each other, and the second fixing member covering the conductive member along the first direction from an outside of the container.

17. The energy storage device according to claim 13, wherein the fixing member abuts the conductive member along the first direction from an inside of the container.

18. The energy storage device according to claim 10, wherein the fixing portion abuts a surface of the conductive member.

19. The energy storage device according to claim 10, wherein the fixing member covers the conductive member along the first direction from an outside of the container.

20. The energy storage device according to claim 10, wherein the fixing member includes a first fixing member and a second fixing member, the first fixing member joining the terminal and the conductive member to each other, and the second fixing member covering the conductive member along the direction opposite to the first direction from an inside of the container.

* * * * *